Nov. 15, 1966     J. A. McCLENATHAN     3,285,614
INTERMEDIATE SHAFT PNEUMATIC SEAL
Filed Aug. 13, 1963
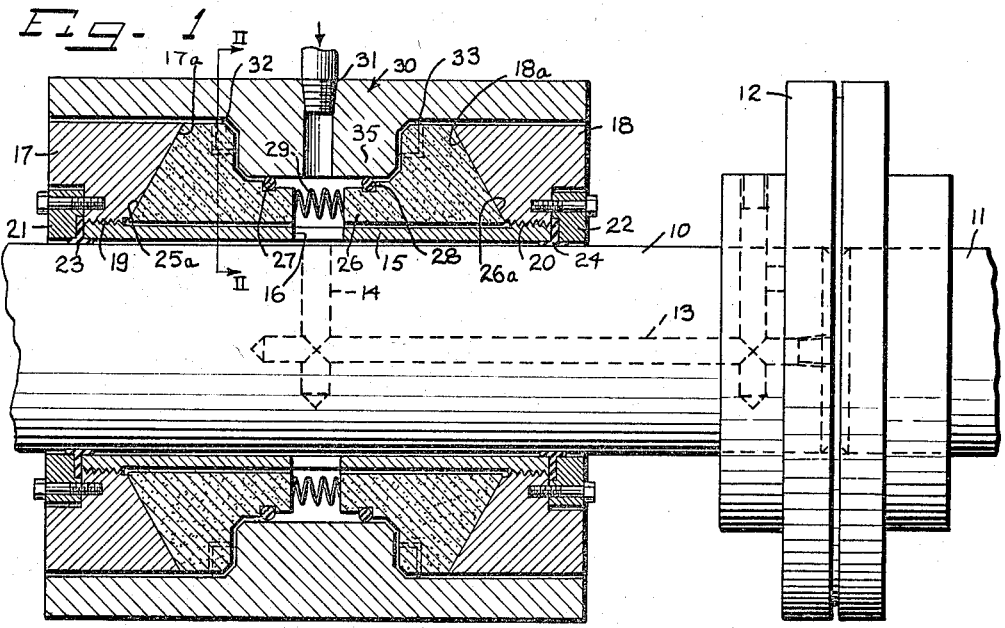
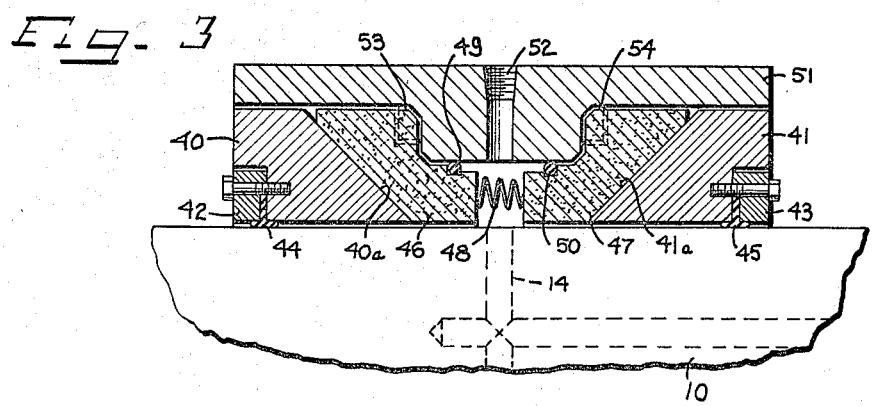
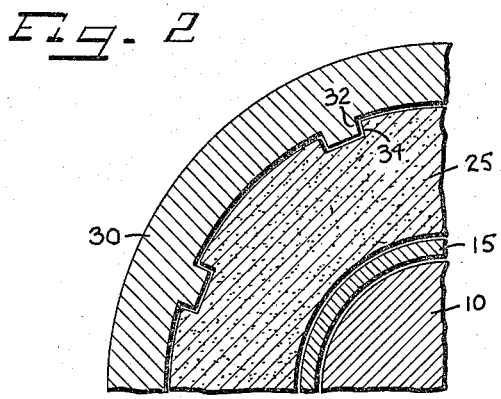
INVENTOR.
John A. McClenathan
BY
ATTORNEYS

United States Patent Office 3,285,614
Patented Nov. 15, 1966

3,285,614
INTERMEDIATE SHAFT PNEUMATIC SEAL
John A. McClenathan, Beloit, Wis., assignor to Beloit Corporation, Beloit, Wis., a corporation of Wisconsin
Filed Aug. 13, 1963, Ser. No. 301,747
5 Claims. (Cl. 277—62)

The present invention relates to improvements in apparatus for directing a flow of air to an air clutch through a rotating shaft and relates to an improved rotary fitting for a shaft for directing a pressurized fluid to the shaft interior.

The invention is primarily concerned with the problems encountered in a pneumatic or fluid pressure system in transmitting a constant fluid pressure to actuate a given mechanism associated with a rotating shaft, and more specifically with the introduction of an air supply through a rotating shaft to an air clutch or similar mechanism such as a recorder or controller. For example in the papermaking industry, heavy drive line shafts are often interrupted by air clutches so that sections may be shut down while operating the remainder of the machine. Where the shaft ends are not available for expensive rifle boring and piping around shaft couplings, an intermediate connection having a shaft seal is used. With the use of an air actuated clutch a means of pneumatic control is obtained by means of the intermediate shaft seal.

A pneumatic rotating seal is often incorporated with an O-ring as a dynamic seal at low surface speeds, but where increased speeds on the order of over 600 feet per minute are employed such dynamic sealing is not practical.

It is accordingly an object of the present invention to provide an improved rotary seal and fitting for positioning on the outer surface of a rotating shaft member for directing a supply of fluid under pressure to the interior of the shaft while the shaft is rotating at high speeds.

A further object of the invention is to provide an improved rotary seal for the outer surface of the shaft of the type above described wherein the sealing surfaces employed obtain their loading from the contained fluid pressure and the sealing surfaces are larger than the area exposed to the sealed pressure to obtain smaller unit pressure on the seal surface.

A further object of the invention is to provide a rotary sealing fitting for the outer surface of the shaft member embodying slanting sealing surfaces for obtaining large seal areas which are self-centering, and which are arranged so that they are located close to the shaft.

A still further object of the invention is to provide a sealing fitting of the type described wherein the mechanism itself is self-supporting and does not need a centering structure, wherein shaft distortion or deflection has no effect on the dynamic sealing surfaces and wherein the unit is compact and long wearing and easy to assemble.

The invention contemplates providing in a preferred embodiment a rotary seal for the outer surface of a shaft including a sleeve member for concentrically surrounding the shaft having a radial passage for communicating with a passage in the shaft, end seals sealing the member to the shaft, axially spaced rotary sealing rings carried on the sleeve member having axially inwardly slanting facing annular sealing faces, axially spaced stationary sealing rings having a fluid flow space therebetween with slanting sealing surfaces in sealing engagement with the sealing faces and biasing means urging the sealing rings apart and with a housing surrounding the stationary sealing rings and sealed thereto with splines locking the housing rotationally to the stationary sealing rings.

Other objects, advantages and features will become more fully apparent with the teaching of the principles of the present invention in connection with the disclosure of the preferred embodiments thereof in the specification, claims and drawings, in which:

FIGURE 1 is a fragmentary sectional view of a shaft and air clutch with seal assembly constructed and operating in accordance with the principles of the present invention;

FIGURE 2 is a fragmentary sectional view taken substantially along line II—II of FIGURE 1; and FIGURE 3 is a fragmentary sectional view taken through a shaft assembly illustrating another form of the invention.

On the drawings:

As illustrated in FIGURES 1 and 2 a shaft has shaft portions 10 and 11 interconnected for driving by an air clutch 12. For connecting the clutch air on pressure is directed to the clutch through an axial air passage 13 connecting with a radial air passage 14.

In order to operate the clutch air under pressure must be delivered to the radial passage 14 through a fitting connected to the outer surface of the shaft 10. While the seal arrangement herein described is particularly well suited to use with an air clutch such as 12, it will be understood that the arrangement may be employed with other mechanisms which require the delivery of fluid to a rotating shaft member for their operation. The air clutch may be of any conventional air clutch design and its details need not be described but will be fully appreciated by those versed in the art.

The rotary seal structure embodies a sleeve 15 which fits closely over the shaft 10. The sleeve is supported in a substantially concentric posititon with the shaft by soft rubber end seals 23 and 24 which are axially compressed so that they expand radially inwardly to engage the outer surface of the shaft 10 as will be described.

Supported on the sleeve 15, which rotates with the shaft 10, are steel collars or rotary sealing rings 17 and 18. The rotary sealing rings having annular generally axially inwardly facing sealing faces 17a and 18a which are preferably slanted and are at an angle extending between the axis of the shaft and a radial line relative to the shaft axis. The sealing surface angle will depend upon the coefficient of friction of the mating surfaces and the angle should be made large enough to prevent locking of the collar and seal after loading. An angle of 45° is well suited to use between mating steel surfaces and carbon surfaces.

Secured to the ends of the rotary sealing rings in notches formed at the ends are metal end rings 21 and 22. These end rings are notched on their inner surfaces so as to clamp the soft rubber rings 23 and 24 against the ends of the steel collar 15.

The rotary rings 17 and 18 are internally threaded at 19 and 21 so as to thread over the ends of the steel collar 15 and hold them firmly in place. In assembly the steel collar will be located so that a radial opening 16 through its center will be in alignment with the radial shaft passage 14 and a plurality of openings such as 16 may be provided around the circumference of the steel collar 15.

In the space between the rotary rings 17 and 18 are stationary sealing rings 25 and 26. These annular stationary rings are formed of carbon or other suitable material and have axially outwardly facing slanting sealing surfaces 25a and 26a which sealingly engage the faces 17a and 18a. The stationary rings 25 and 26 are spaced and fluid under pressure can be spaced between them and will act on their end surfaces to hold them against the rotary sealing rings thus maintaining good sealing contact.

For times when there is no fluid pressure in the space between the stationary rings 25 and 26, a plurality of light axially extending annularly spaced coil compression spring 29 are located between the rings 25 and 26.

Surrounding the stationary rings 25 and 26, and preferably surrounding the entire assembly is an annular housing 30. The housing is shown as being self-located by the assembly by having a radially inwardly extending projection 35 which projects into recesses formed in the stationary rings. Between the inner surface of the projection 35 and the rings 25 and 26 are a pair of annular resilient sealing rings 27 and 28, such as O-rings, which prevent the escape of fluid from the space between the stationary rings 25 and 26 and the housing, and which permit relative axial movement of the stationary rings with wear of the sealing surfaces. To lock the stationary sealing rings rotationally relative to the housing 30 splines 32 and 33 are provided extending in an axial direction. The splines having inwardly extending teeth extend into recesses 34 in the stationary carbon rings, as shown in FIGURE 2.

The housing has a radially inwardly extending air flow passage 31 which communicates with the space between the stationary rings 25 and 26 and is arranged for connection to an air supply line.

FIGURES 1 and 2 show the preferred arrangement and FIGURE 3 shows an alternate embodiment wherein the inner sleeve of FIGURES 1 and 2 is omitted. In FIGURE 3 rotary sealing rings 40 and 41 having outwardly slanted generally axially inwardly facing sealing faces 40a and 41a are provided sealingly engaged by stationary carbon rings 46 and 47. The rotary rings are locked to the outer surface of the shaft 10 by compressible sealing rings 44 and 45 which are squeezed inwardly by end rings 42 and 43 bolted to the rotary sealing rings 40 and 41.

The stationary rings are surrounded by a housing 51 with annular seals 49 and 50 between the housing and rings 46 and 47. Light springs 48 extend between the rings, and a conduit or passage 52 extends radially inwardly through the housing to communicate with the space between the rings 46 and 47.

Thus it will be seen that I have provided an improved clutch and seal connection assembly which meets the objectives, advantages and features above set forth. In the arrangement various advantages are obtained including the fact that the sealing surfaces obtained their loading from the enclosed fluid pressure and the loading is proportional to the air pressure to be sealed. The sealing surface is larger than the area exposed to the enclosed air to obtain a smaller unit pressure on the seal surface. The O-ring seals between the housing and the stationary seals are positioned for continuous sealing even though the dynamic seal will wear permitting axial movement of the stationary seals.

The rotary seals are threaded to their supporting sleeve which holds them in a relative concentric position and makes the seal assembly a self-contained unit since the rotary seals can be backed off to release the compressible seals and then slid over a shaft and tightened. The end rings are held in place by socket head cap screws which eliminate rotating protrusions which may be hazardous to personnel. The housing is self-supporting and does not need a centering structure. Further, the slanted seal surfaces have a self-centering effect for the seal assembly and give a short break-in period if the surfaces do not perfectly match at installation. The surface velocity of the dynamic sealing surfaces is minimized since the surfaces are as close to the shaft diameter as possible without using the shaft as a part of the seal and shaft distortion or reflection will have no effect on this dynamic seal.

The seal is designed to operate over a wide range of conditions and has served to operate in the form as shown at 60 p.s.i. and up to 1500 f.p.m. surface speed. As will be noted, the arrangement of the slanted seal surfaces places the loaded carbon graphite stationary rings in compression and their maximum allowable compression strength is much larger than the tensile strength permitting the operating stresses to be in the greater strength range with the design as illustrated.

While the preferred arrangement is illustrated, in some instances a stepped series of surfaces could be employed instead of the slanting dynamic seal or the sealing action could be of a labyrinth or pressure drop arrangement.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A rotary seal for directing fluids radially inwardly toward a shaft having a radial passage comprising, a sleeve member for concentrically surrounding the shaft having a radial passage for communicating with the passage of the shaft, end seals sealing the sleeve member to the shaft, axially spaced rotary sealing rings carried on the sleeve member having axially inwardly facing annular continuous sealing faces, axially spaced stationary sealing rings having a fluid flow space therebetween communicating with said sleeve passage and having sealing surfaces in continuous sealing engagement with said sealing faces, an annular housing surrounding said stationary sealing rings, said rotary sealing faces and said stationary sealing surfaces being at an angle between the axis of the shaft and a radial line, said sealing faces and sealing surfaces extending from said annular housing surrounding said stationary sealing rings to said sleeve member with substantially no open space between said sealing faces and sealing surfaces, and annular sliding seals between said housing and said stationary sealing rings.

2. A rotary seal for directing fluid radially inwardly toward a shaft having a radial passage comprising, a sleeve member for concentrically surrounding the shaft having a radial passage for communicating with the passage of the shaft, axially spaced rotary sealing rings carried on the sleeve member having axially inwardly facing annular continuous sealing faces, axially spaced stationary sealing rings having a fluid flow space therebetween communicating with said sleeve passage and having sealing surfaces contiguous to and in substantially continuous sealing engagement with said sealing faces, an annular housing surrounding said stationary sealing rings, said sealing faces and sealing surfaces extending from said annular housing surrounding said stationary sealing rings to said sleeve member with substantially no open space between said sealing faces and sealing surfaces, axially extending splines between the said annular housing and said stationary sealing rings permitting axial movement of the stationary sealing rings relative to the housing, an annular extending sliding seal between the housing and said stationary sealing rings.

3. A rotary seal for directing fluid radially inwardly toward a shaft having a radial passage comprising, a sleeve member for concentrically surrounding the shaft having a radial passage for communicating with the passage of the shaft, end seals sealing the sleeve member to the shaft, axially spaced rotary sealing rings carried on the sleeve member having axially inwardly facing annular substantially continuous sealing faces, annular threaded attaching means between the rotary sealing rings and the sleeve, axially spaced stationary sealing rings having a fluid flow space therebetween communicating with said sleeve passage and having sealing surfaces in a substantially contiguous sealing engagement with said sealing faces, an annular housing surrounding said stationary sealing rings, said sealing faces and sealing surfaces extending from said annular housing surrounding said stationary sealing rings to said sleeve member with substantially no open space between said sealing faces and sealing surfaces, an annular extending sliding seal between said housing and said stationary sealing rings permitting axial movement of the stationary sealing ring relative to the housing.

4. A rotary seal for directing fluid radially inwardly toward a shaft having a radial passage comprising, a sleeve member for concentrically surrounding the shaft having a radial passage for communicating with the passage of the shaft, axially spaced rotary sealing rings carried on the sleeve member having axially inwardly facing annular continuous sealing faces, end rings secured to said rotary sealing rings, a soft annular compressible seal between the sleeve and end rings and sealed against the shaft, axially spaced stationary sealing rings having a fluid flow space therebetween communicating with said sleeve passage and having sealing surfaces in contiguous sealing engagement with said sealing faces, an annular housing surrounding said sealing rings, said rotary sealing faces and said stationary sealing surfaces extending from said annular housing surrounding said stationary sealing rings to said sleeve member with substantially no open space between said sealing faces and sealing surfaces, and annular sliding seals between said housing and said stationary sealing rings permitting axial movement of the stationary sealing rings relative to the housing.

5. In a rotary shaft having a first portion and a second portion, and an air actuated clutch between said portions, a combination comprising an air passage through said first portion communicating with said clutch, a sleeve surrounding said first portion being threaded at the end and having a radial passage communicating with the air passage in said first portion, rotary sealing rings threaded on the end of the sleeve having axially inwardly facing annular continuous slanting sealing faces, end rings attached to the end of said sealing rings, soft compressible seals between the end rings and the end of the sleeve member sealing the sleeve to the first portion of said shaft, annular stationary sealing rings between said rotary sealing rings having annular slanting axially outwardly facing sealing surfaces, an annular housing surrounding said rings with a ridge having an inner cylindrical surface and projecting between said stationary rings and a radial passage communicating with the space between said stationary rings, said sealing faces and sealing surfaces extending from said annular housing to said sleeve with substantially no open space between said sealing faces and sealing surfaces, a plurality of spaced axially extending expansion springs between said stationary sealing rings urging the stationary rings outwardly toward rotary sealing rings, an annular sliding seal between each of the said stationary rings and said inner cylindrical surface of the housing, said sliding seals located radially inwardly of the outer radial extremity of said slanting sealing faces, and splines between said annular housing and said stationary rings permitting relative axial movement of said stationary rings.

References Cited by the Examiner

UNITED STATES PATENTS

| | | | |
|---|---|---|---|
| 1,053,918 | 2/1913 | Meyer | 192—85 |
| 2,037,144 | 4/1936 | Olson. | |
| 2,270,927 | 1/1942 | Browne. | |
| 3,021,146 | 2/1962 | Sommer et al. | 277—3 |

LAVERNE D. GEIGER, *Primary Examiner.*

SAMUEL ROTHBERG, *Examiner.*

L. RANEY, J. MEDNICK, *Assistant Examiners.*